United States Patent [19]
Harr, Jr.

[11] Patent Number: 5,829,673
[45] Date of Patent: Nov. 3, 1998

[54] MODULAR CASH BOX

[75] Inventor: James Michael Harr, Jr., O'Fallon, Mo.

[73] Assignee: Coin Acceptors, Inc., St. Louis, Mo.

[21] Appl. No.: 953,049

[22] Filed: Oct. 17, 1997

Related U.S. Application Data

[63] Continuation of Ser. No. 627,369, Apr. 4, 1996, abandoned.

[51] Int. Cl.⁶ .................................................. G07B 15/00
[52] U.S. Cl. ............................................. 232/15; 232/1 D
[58] Field of Search ....................... 232/1 D, 15; 109/22, 109/46; 271/145, 207; 220/4.26, 4.27

[56] References Cited

U.S. PATENT DOCUMENTS

| | | | |
|---|---|---|---|
| 2,761,581 | 9/1956 | Cohee | 220/4.27 X |
| 3,655,186 | 4/1972 | Bayha | 271/88 |
| 3,656,615 | 4/1972 | Ptacek | 209/73 |
| 3,917,260 | 11/1975 | Okkonen et al. | 271/181 |
| 3,918,359 | 11/1975 | Hennells et al. | 100/52 |
| 4,212,415 | 7/1980 | Neely | 220/4.26 X |
| 4,491,269 | 1/1985 | Sweazey et al. | 232/1 D |
| 4,678,072 | 7/1987 | Kobayashi et al. | 194/206 |
| 4,775,824 | 10/1988 | Barnes et al. | 318/567 |
| 4,809,966 | 3/1989 | Kobayashi et al. | 271/181 |
| 4,809,967 | 3/1989 | Kondo | 271/181 |
| 5,209,395 | 5/1993 | Zouzoulas et al. | 232/1 D X |
| 5,322,275 | 6/1994 | Gardellini et al. | 271/306 |
| 5,333,714 | 8/1994 | Watabe et al. | 194/206 |

FOREIGN PATENT DOCUMENTS

0665520A2  4/1995  European Pat. Off. .

OTHER PUBLICATIONS

Document entitled "BA30 Bill Acceptor Operation and Service Manual" authored by Coin Acceptors, Inc., printed in U.S.A., Mar. 1995.

*Primary Examiner*—Blair Johnson
*Attorney, Agent, or Firm*—Cohn, Powell & Hind, P.C.

[57] ABSTRACT

This modular cash box system includes a bill validator transport housing (12) having a bill exit opening (18), a cash box housing (10) connectable to the transport housing (12) to receive bills and a plurality of modular sections (20) each having a first end (96) connectable to the transport housing (12) and a second end (98) connectable to the cash box housing (10). The first and second ends (96, 98) of the modular sections (20) are also connectable to each other. An adaptor frame (14) may be used to connect the cash box (10) and the modular sections (20) to the transport housing (12) and a substitute enlarged capacity cash box housing (110) may also be used.

9 Claims, 3 Drawing Sheets

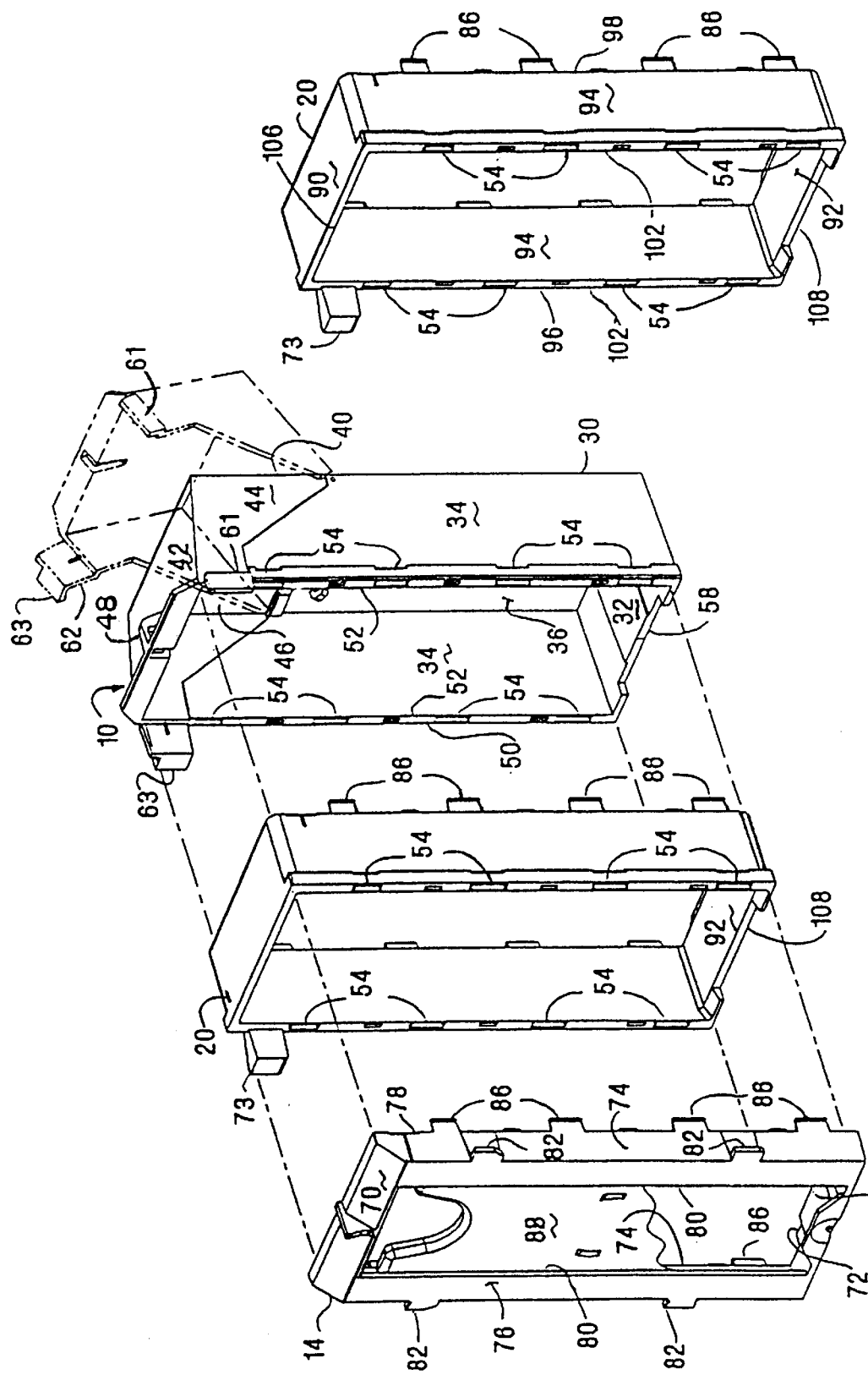

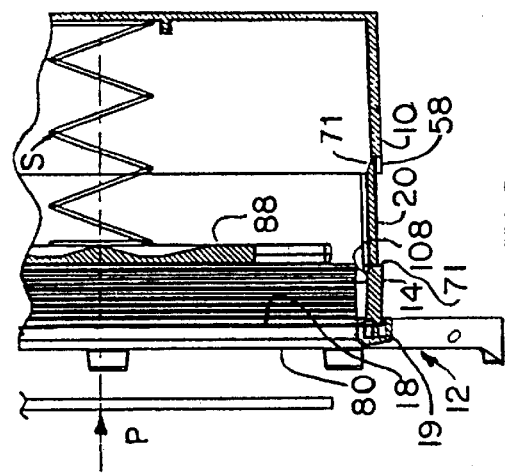
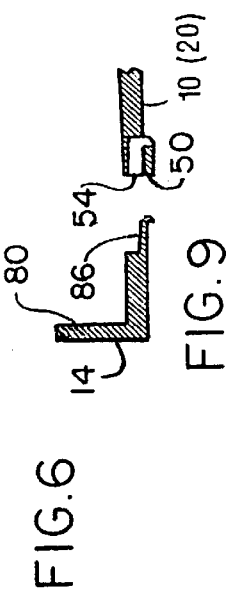
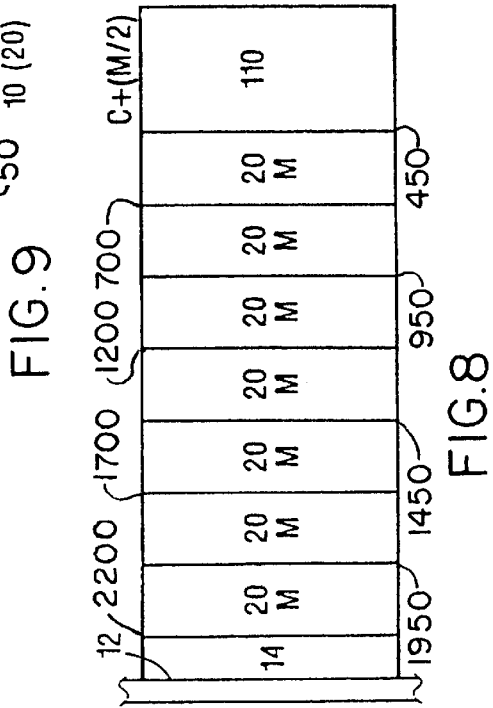
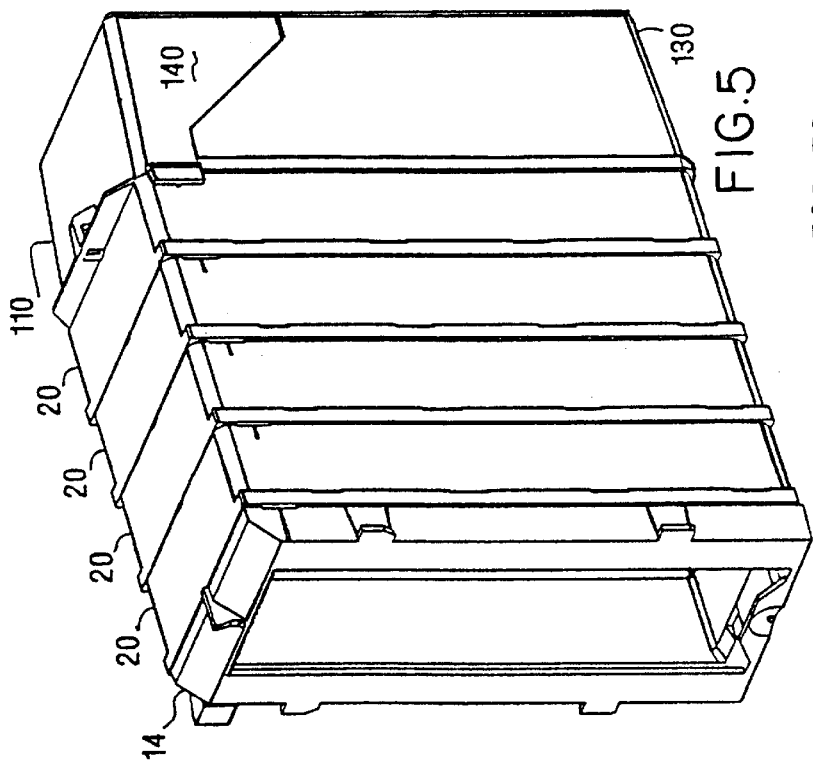
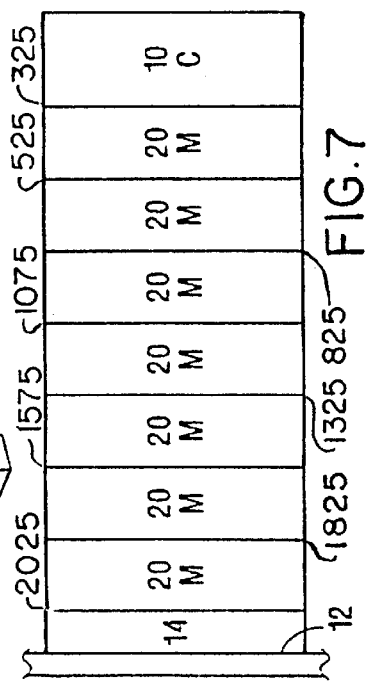

MODULAR CASH BOX

This application is a continuation of copending application Ser. No. 08/627,369 filed on Apr. 4, 1996 now abandoned.

BACKGROUND OF THE INVENTION

This invention relates generally to cash boxes for use in conjunction with bill handling devices for vending machines and the like, and particularly to a modular cash box providing the device with enlarged bill stacking capacity capability.

Devices which transport, validate and stack currency, and particularly bills, are well-known in the vending and entertainment industry. Such devices are often used with vending machines which typically include a bill transport system which validates and delivers bills to a cash box in which the bills are stacked prior to collection. In general, the cash box has a fixed capacity and can only hold a specified number of bills. A typical cash box is integrally formed with the bill validator or is attached to the bill validator transport system housing, by means of an adaptor, it receives bills from the bill validator and includes a lid by which the bills can readily be accessed.

Vending machine capacities are continually increasing as are product prices. These factors have led to a growing need for increased capacity cash boxes. In the past, such custom sized cash boxes of increased capacity have been made from low reliability sheet metal because of the expense and impracticability of custom molding larger capacity cash boxes to meet the needs of an individual vendor. Thus, the vendor who cannot use the standard size molded plastic cash box has been obliged to order an inferior sheet metal cash box.

This invention solves this and other problems in a manner not revealed in the known prior art.

SUMMARY OF THE INVENTION

This enlarged capacity cash box system for bill handling devices utilizes modular sections which provide a wide range of bill storage capacity. Because of the use of modular units, which can be molded plastic and clipped together in snap-fitted relation, a vending machine can be assured of a reliable cash box to suit the need of virtually any cash box capacity requirement.

In addition, because of the use of standard size modular extension units and the optional use of a larger capacity cash box the provision of overall increased bill capacity is greatly facilitated.

This modular cash box system comprises a bill transport means including a housing having a bill exit opening means; a cash box housing having an open end and being selectively connectable to the bill transport housing to receive bills from the bill exit opening means; and modular section means having first and second ends the first end being operatively selectively connectable to the bill transport system housing to receive bills from the bill exit opening means and the second end being operatively selectively connectable to the cash box housing open end when increased cash box capacity is required.

It is an aspect of this invention to provide that the modular section means includes a plurality of modular sections each having first and second ends, the first end being operatively selectively connectable to the transport system housing bill exit opening means and the second end being operatively selectively connectable to the cash box housing open end, and each second end being connectable to the first end of a like modular section.

It is another aspect of this invention to provide that the modular sections are of substantially identical capacity.

It is still another aspect of this invention to provide an adaptor frame having first and second ends, the first end being connectable to the transport system housing exit opening means and the second end being selectively connectable to the cash box housing open end and the first end of the modular section means.

It is yet another aspect of this invention to provide that the cash box housing has a capacity of C bills; and the modular sections each add a capacity of M bills.

It is an aspect of this invention that an enlarged capacity substitute cash box housing is provided having a capacity of C bills plus M/2 bills.

It is yet another aspect of this invention to provide that each modular section has a capacity of two hundred and fifty bills; and the capacity of the cash box housing is three hundred and twenty five bills.

It is yet another aspect of this invention to provide that the modular sections are connectable to each other in snap-fitted relation, and another aspect to provide that the cash box housings are snap-fitted to the modular section and to the adaptor frame.

This modular cash box is relatively simple in construction, inexpensive to manufacture and may be readily expanded or contracted in capacity as desired.

BRIEF DESCRIPTION OF THE DRAWINGS

FIG. 3 is a perspective view of an individual modular section;

FIG. 4 is an exploded perspective view of a cash box and adaptor frame using a capacity-increasing modular section;

FIG. 5 is a perspective view similar to FIG. 4, not exploded, and using multiple modular sections and an enlarged capacity cash box housing;

FIG. 6 is a fragmentary vertical cross section taken through the cash box system showing the stacked bills;

FIG. 7 is a diagrammatic rendering an increased capacity cash box arrangement;

FIG. 8 is a complementary diagrammatic rendering of another increased capacity cash box arrangement; and FIG. 9 is an enlarged section through line 9—9 of FIG. 2.

DESCRIPTION OF THE PREFERRED EMBODIMENT

Figure 2:
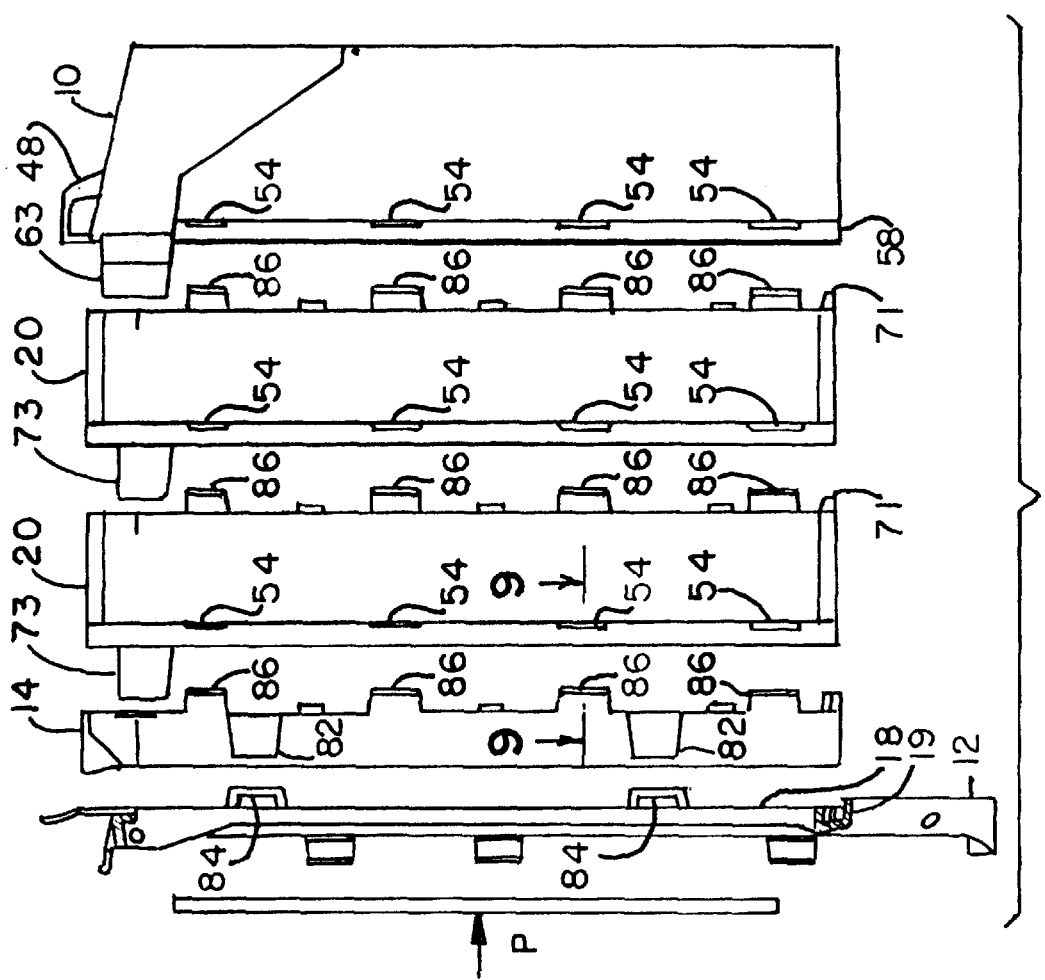
FIG. 2 is a similar view of a cash box and adaptor frame using increased capacity modular sections.
Figure 1:
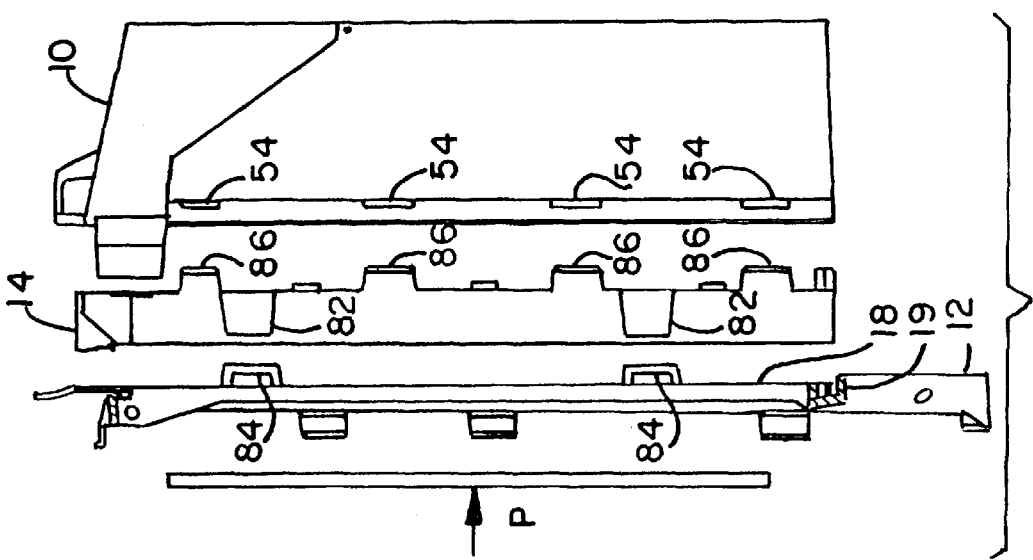
FIG. 1 is an exploded elevational view of a cash box and adaptor frame arrangement used in conjunction with a bill validator but without the use of increased capacity modular sections.

Referring now by reference numerals to the drawings and first to FIGS. 1 and 2, it will be understood that in FIG. 1 an arrangement is shown in which a cash box housing 10 is connected to the transport system housing 12 of a bill validator 11 by means of an adaptor frame 14. In FIG. 2, an arrangement is shown in which a cash box housing 10 is operatively connected to the adaptor frame 14 by means of a plurality of intermediate modular sections 20 to increase the capacity of the cash box 10. FIG. 3 is a perspective view of an individual modular section 20 and FIG. 4 is an exploded perspective view showing the cash box housing 10, the adaptor frame 14, and a single modular section 20 prior to installation.

As shown in FIG. 4, the cash box housing 10 includes a lower portion 30 having a bottom wall 32, opposed side walls 34 and a back wall 36. Attached to the lower portion 30 is a hinged upper portion providing a lid 40 and having a top wall 42, side walls 44 and a back wall 46. A handle means 48 is provided on lid 40 to facilitate opening and closing of the lid. The cash box housing 10 includes a generally U-shaped front interface portion 50, defining an open end projecting above the lid hinge. The interface portion 50 includes side flanges 52 provided with slots 54 and a lower cutout portion 58. The lid 40 rotates about the hinge and snaps into place by means of side guide lugs 61 and 62 overlapping the adjacent modular section 20. Guide lug 62 includes a switch element 63 as will be discussed. The lid 40 is shown in the open position in phantom outline.

The adaptor frame 14 includes a top wall 70, a bottom wall 72 and opposed side walls 74. The adaptor frame 14 includes a generally rectangular front interface portion 76 and a generally rectangular rear interface portion 78 said portions defining open ends. The front interface 76 includes inwardly facing flanges 80 and outwardly projecting lugs 82. The flanges 80 provide a stop for a spring-loaded bill compressor plate 88 and the lugs 82 engage associated hooks 84 on the margin of the open end of the bill validator transport housing 12, see FIG. 6, to which the adaptor frame 14 may be connected. The rear interface portion 78 includes a plurality of snap elements 86 which are shown in enlarged detail in FIG. 9 and which may be received in snap-fitted relation with associated snap openings 54 molded into the interface portion 50 of the cash box 10 to provide a connection means between the cash box and the adaptor frame 14 when no modular sections 20 are used to enlarge the capacity of the cash box 10. As shown in FIG. 6, the rear interface portion 78 also includes a stabilizing tongue 71 received by the lower cut-out portion 58 of the cash box 10.

The modular sections 20 may be used in any number from one up to seven or more. As best shown in FIG. 3, each modular section 20 includes a top wall 90, a bottom wall 92 and side walls 94. Each modular section 20 also includes a front interface portion 96 and a rear interface portion 98 defining open ends. The front interface portion 96 is similar to the front interface portion of the cash box 10 in that it includes side flanges 102 having a plurality of slots 54, which receive snap-elements 86 of the adaptor frame 14, or the snap elements 86 of an identical modular section 20. The front interface portion 96 also includes an upper portion 106 and a lower cut-out portion 108, which receives the stabilizing tongue 71 of the adaptor frame 14 (FIG. 2). The rear interface 98 includes a plurality of snap elements 86 which are received within slots 54 of the cash box 10, or within slots 54 of an identical modular section 20.

As shown in FIG. 4, the upper left corner of the cash box lid includes a switch element 63 and similarly each modular section 20 includes a switch element 73. The switch elements overlap the adaptor frame 14 to engage an associated element (not shown) on the bill validator housing 12. The switch elements 73, 63 provide that when the cash box system is placed on the bill validator housing 12, the stacker motor (not shown) will be activated to drive the bill plunger P, check if the cash box is full, and stack bills if it is not.

It will be understood that although only one modular section 20 is disclosed in FIG. 4, by way of example, a plurality of modular sections and a different capacity cash box may be provided.

FIG. 5 illustrates such a modified arrangement in which four identical modular sections 20 are used in conjunction with a larger capacity cash box 110 having a lower portion 130 and a lid 140. The modified arrangement uses an identical adaptor frame 14. The cash box 110 is identical with the cash box 10 except that, in the embodiment shown, it has the capacity equal to that of cash box 10 plus one half of the capacity of one of the modular sections 20. The front interface portion of the cash box 110 is substantially identical to that of the cash box 10 shown in FIG. 3 and accordingly cash box 110 may be snap-fitted to the adaptor frame 14 or to the rear interface portion 98 of a modular section 20.

The advantage of this optional cash box arrangement is demonstrated diagrammatically by reference to FIGS. 7 and 8. FIG. 7 illustrates an arrangement in which a regular cash box 10 is used in conjunction with 7 modular sections 20. FIG. 8 illustrates an arrangement in which oversize cash box 110 is substituted for cash box 10. It can be seen from TABLE A below that the cash box 10 has a depth to provide capacity of 325 bills, that each modular section has a depth between interface portions to provide a capacity of 250 bills and that cash box 110 has a depth to provide the same capacity as cash box 10 plus the capacity of one half of a modular section 20, that is 325 bills plus 125 bills, a total of 450 bills. With such an arrangement, increments of 125 bills are possible. Thus, by using 7 identical modular sections and an option of one of two cash boxes, a range from 325 bills to 2,200 bills is possible as shown in TABLE A and illustrated diagrammatically in FIGS. 7 and 8.

TABLE A

Capacity 1.25 inch (250 bill) modular sections

| No. of Sections | Capacity 325 Cash Box | Depth 1.25 Inches | Capacity 450 Cash Box | Depth 1.25 Inches |
| --- | --- | --- | --- | --- |
| 0 | 325 | 2.37 | 450 | 3.00 |
| 1 | 575 | 3.62 | 700 | 4.25 |
| 2 | 825 | 4.87 | 950 | 5.50 |
| 3 | 1075 | 6.12 | 1200 | 6.75 |
| 4 | 1325 | 7.37 | 1450 | 8.00 |
| 5 | 1575 | 8.62 | 1700 | 9.25 |
| 6 | 1825 | 9.87 | 1950 | 10.50 |
| 7 | 2075 | 11.12 | 2200 | 11.75 |

It will be understood that TABLE A and FIGS. 7 and 8 are exemplary only and that other ranges may be chosen depending on the depth of the modular sections 20 and the capacities of the two cash boxes 10 and 110.

FIGS. 1 and 6 show the bill validator 12 with a recess at the open end 18 and having a seating portion 19 at the bottom of the recess. The recess margin area of open end 18 is compatibly configured to receive front interface 76 of the adaptor frame 14. The adaptor frame 14 is secured to the bill validator housing open end 18 by the connection between the adaptor frame lugs 82 and the hook elements 84 receiving the lugs 82. FIG. 9 shows the nature of the connection between the snap element 86 and the receiving opening 54. This connection is substantially identical to that provided between the adaptor frame 14 and the cash boxes 10 and 110, and between the one interface of a modular section 20 and the other interface of a like modular section 20. As also shown in FIG. 6 a compression spring S extends and is attached between the rear of the bill compression plate 88 and the back wall 36 of the cash box 10. The spring S is selected to apply pressure consistent with the overall bill capacity required.

It is thought that the structural arrangement of parts has been fully understood from the foregoing description, but for completeness of disclosure the installation of the system will be briefly described.

For the purposes of example, it will be supposed that cash box 10 has a capacity of 375 bills (C), that each modular section 20 has a capacity of 250 bills (M) and that cash box 110 has a capacity of C+M/2, i.e., 325 plus 125=450 bills.

It will be further supposed that a cash box system having a stacking capability of 1,450 bills is required. It is a simple matter to snap together four modular sections 20 at 250 bills (M) each, having a combined capacity of 1,000 bills, snap-fitting an oversize cash box 110 at the rear end having a capacity of 450 bills (C+M/2), and snap-fitting an adaptor frame 14 at the front end. This arrangement provides the desired capacity of 1,450 bills and the adaptor frame 14, the modular sections 20 and the cash box 110 can readily be hooked onto the hooks 84 of bill validator housing 12 by means of the lugs 82 of the adaptor frame 14 as shown in FIG. 6. If desired, the entire cash box assembly including the modular sections 20 and the adaptor frame 14 can be removed as a unit from the validator housing 12 to facilitate removal of the stacked bills. It will be understood that such removal will open the switch 73 which indicates that the cash box has been removed.

Although the invention has been described by making detailed reference to the preferred embodiments, such detail is to be understood in an instructive rather than in any restrictive sense, many other variants being possible within the scope of the claims hereunto appended.

I claim as my invention:

1. An enlarged capacity modular cash box system for storing bills comprising:
    (a) an adaptor frame including an opening adapted to receive a bill from a bill validator housing;
    (b) a bill housing adapted to store bills in a stack and having a spring-loaded compressor plate adapted to stack said stored bills;
    (c) a bill plunger adapted to push bills against the compressor plate; and
    (d) at least one modular section adapted to be inserted between the adaptor frame and the bill housing to increase bill storage capacity of the cash box system.

2. A modular cash box system as defined in claim 1, in which:
    (e) a plurality of modular sections is adapted to be inserted between the adaptor frame and the bill housing to further increase bill storage capacity of the cash box system.

3. A modular cash box system as defined in claim 2, in which:
    (f) the modular sections are of substantially identical bill storage capacity.

4. A modular cash box system as defined in claim 1, in which:
    (e) the bill housing has a storage capacity of a predetermined number of bills; and
    (f) each modular section adds a storage capacity of a different predetermined number of bills.

5. A modular cash box system as defined in claim 4, in which:
    (g) an enlarged storage capacity substitute bill housing is provided having a storage capacity equal to the storage capacity of the original bill housing plus one-half of the storage capacity of a modular section.

6. A modular cash box system as defined in claim 5, in which:
    (h) each modular section has a storage capacity of two hundred and fifty bills; and
    (i) the storage capacity of the cash box housing is three hundred and twenty five bills.

7. A modular cash box system as defined in claim 2, in which:
    (f) the modular sections are connectable to the bill housing and to each other in snap-fitted relation.

8. A modular cash box system as defined in claim 1, in which:
    (e) the cash box system is disposed in a substantially horizontal position.

9. A modular cash box system as defined in claim 8, in which:
    (f) a spring extends between the compressor plate and the bill housing passing through the modular section.

* * * * *